US012789768B2

(12) United States Patent
Miranda et al.

(10) Patent No.: US 12,789,768 B2
(45) Date of Patent: Nov. 10, 2026

(54) COMPUTER SYSTEM FOR A VEHICLE, VEHICLE, METHOD TO ADJUST A BRAKE PRESSURE, COMPUTER PROGRAM AND NON-TRANSITORY COMPUTER-READABLE STORAGE MEDIUM

(71) Applicant: Volvo Truck Corporation, Gothenburg (SE)

(72) Inventors: Eduardo Miranda, Curitiba (BR); Carlos Abilio Travaglia, Curitiba (BR); André Rodrigues, Curitiba (BR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 19/311,219

(22) Filed: Aug. 27, 2025

(65) Prior Publication Data

US 2026/0061977 A1 Mar. 5, 2026

(30) Foreign Application Priority Data

Sep. 3, 2024 (EP) .................................... 24198228

(51) Int. Cl.
*B60T 8/171* (2006.01)
*B60T 8/172* (2006.01)

(52) U.S. Cl.
CPC .............. *B60T 8/171* (2013.01); *B60T 8/172* (2013.01); *B60T 2240/03* (2013.01)

(58) Field of Classification Search
CPC ...... B60T 8/171; B60T 8/172; B60T 2240/03; B60T 8/1725; B60T 13/662; B60T 17/221
See application file for complete search history.

(56) References Cited

U.S. PATENT DOCUMENTS

| | | | | |
|---|---|---|---|---|
| 8,326,509 | B2 * | 12/2012 | Logan et al. | B60T 13/662 |
| 8,897,957 | B2 | 11/2014 | Stoehr | |
| 10,457,263 | B2 * | 10/2019 | Miller, Jr. et al. | B60T 17/221 |
| 2004/0041464 | A1 | 3/2004 | Eckert et al. | |

(Continued)

FOREIGN PATENT DOCUMENTS

| | | | |
|---|---|---|---|
| CN | 207496406 | U | 6/2018 |
| DE | 10243913 | A1 | 12/2003 |

OTHER PUBLICATIONS

Extended European Search Report for European Patent Application No. 24198228.9, mailed Mar. 3, 2025, 10 pages.

*Primary Examiner* — Brodie J Follman
(74) *Attorney, Agent, or Firm* — Withrow & Terranova, PLLC

(57) ABSTRACT

A computer system for a vehicle comprising an electronic brake system, the computer system comprising processing circuitry configured to receive a wheel temperature of at least two wheels of the vehicle, from temperature sensors located on the at least two wheels; calculate an average wheel temperature from the received wheel temperatures; for each wheel temperature, determine a wheel temperature difference; the processing circuitry being configured to, if the electronic brake system is activated and a wheel temperature difference of one given wheel is strictly above a temperature difference threshold, reduce a brake pressure applied to the given wheel by the electronic brake system and increase a brake pressure applied to the other wheel by the electronic brake system to maintain a demanded brake pressure constant on the wheels.

12 Claims, 4 Drawing Sheets

(56) References Cited

U.S. PATENT DOCUMENTS

| | | | | |
|---|---|---|---|---|
| 2019/0023252 | A1 | 1/2019 | Miller, Jr. et al. | |
| 2021/0354671 | A1* | 11/2021 | Cho | B60T 8/26 |
| 2022/0324429 | A1 | 10/2022 | Sakhare et al. | |

* cited by examiner

COMPUTER SYSTEM FOR A VEHICLE, VEHICLE, METHOD TO ADJUST A BRAKE PRESSURE, COMPUTER PROGRAM AND NON-TRANSITORY COMPUTER-READABLE STORAGE MEDIUM

PRIORITY APPLICATIONS

The present application claims priority to European Patent Application No. 24198228.9, filed on Sep. 3, 2024, and entitled "COMPUTER SYSTEM FOR A VEHICLE, VEHICLE, METHOD TO ADJUST A BRAKE PRESSURE, COMPUTER PROGRAM AND NON-TRANSITORY COMPUTER-READABLE STORAGE MEDIUM," which is incorporated herein by reference in its entirety.

TECHNICAL FIELD

The disclosure relates generally to braking systems for vehicles. In particular aspects, the disclosure relates to a computer system for a vehicle, a vehicle, a method to adjust a brake pressure, a computer program and a non-transitory computer-readable storage medium. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

It is well-known to apply pressure on wheels of a vehicle so that the vehicle brakes, and this is generally done using friction brakes on the wheels. However, if too much pressure is applied on the brakes, the temperature of the wheels may become too high. This may cause damage to the brakes, in particular to a lining of the brakes, and/or reduce the performance of the brakes.

SUMMARY

According to a first aspect of the disclosure, the invention relates to a computer system for a vehicle, the vehicle comprising an electronic brake system, the computer system comprising processing circuitry configured to:

- receive a wheel temperature of at least two wheels of the vehicle, from temperature sensors located on the at least two wheels;
- calculate an average wheel temperature from the received wheel temperatures;
- for each wheel temperature received, determine a wheel temperature difference between the wheel temperature and the average wheel temperature;
- the processing circuitry being further configured to, if the electronic brake system is activated and a wheel temperature difference of one given wheel of the at least two wheels is strictly above a temperature difference threshold, reduce a brake pressure applied to the given wheel by the electronic brake system and increase a brake pressure applied to the other wheel or wheels by the electronic brake system to maintain a demanded brake pressure constant on the wheels.

The first aspect of the disclosure may seek to limit the damage caused to the brakes by high temperatures of the wheels of a vehicle when the vehicle is braking, with no impact on the braking performance of the vehicle. A technical benefit may include adapting the brake pressure based on the wheel temperature, to allow the wheel with an excessive temperature to cool. This preserves the lining of the brakes, thus increases the durability of the brakes, and may also improve braking performance. This is done with no impact on braking performance, as the demanded brake pressure is maintained constant, which ensures optimal safety for the driver and people in the vicinity of the vehicle.

Optionally in some examples, including in at least one preferred example, the processing circuitry is further configured to, after a brake pressure applied to the given wheel has been reduced, if the wheel temperature difference of the given wheel of the at least two wheels is equal to or below the temperature difference threshold, stop changing the brake pressures applied to the wheels based on the wheel temperature difference. A technical benefit may include dynamically monitoring the evolution of the temperature of the given wheel, to reduce the brake pressure for the least amount of time possible.

Optionally in some examples, including in at least one preferred example, the processing circuitry is further configured to:

- determine if an emergency system of the vehicle is activated; and stop performing changes to the brake pressures based on wheel temperature differences, independently of the value of the wheel temperature differences, if the emergency system of the vehicle is activated. A technical benefit may include improving the safety of the driver and people in the vicinity of the truck by prioritizing emergency systems, to ensure that they function as intended when they are activated.

According to a second aspect of the disclosure, the invention further relates to a vehicle comprising wheels, an electronic brake system, at least two temperature sensors located on at least two of the wheels of the vehicle and the computer system previously described.

The second aspect of the disclosure may seek to provide a vehicle wherein the damage caused to the brakes by high temperatures of the wheels of a vehicle is limited, with no impact on the braking performance of the vehicle. A technical benefit may include adapting the brake pressure based on the wheel temperature, to allow the wheel with an excessive temperature to cool. This preserves the lining of the brakes, thus increases the durability of the brakes, and may also improve braking performance. This is done with no impact on braking performance, as the demanded brake pressure is maintained constant, which ensures optimal safety for the driver and people in the vicinity of the vehicle.

Optionally in some examples, including in at least one preferred example, a temperature sensor is located on each wheel of the vehicle. A technical benefit may include better limiting the damage to all the brakes of the vehicle, by monitoring the temperature of each wheel of the vehicle.

Optionally in some examples, including in at least one preferred example, the temperature sensors are integrated into a tire pressure monitoring system of the vehicle. A technical benefit may include limiting the number of modifications made to the vehicle, by using preexisting systems. This simplifies the manufacturing of the vehicle and decreases the cost of vehicles that include such a computer system.

Optionally in some examples, including in at least one preferred example, each temperature sensor is configured to measure a temperature of a tire of the wheel on which each temperature sensor is located, and the wheel temperature of each wheel is a temperature of the tire of each wheel. A technical benefit may include reusing already available temperature data, which limits the use of additional sensors, and also limits complex calculations or processing.

According to a third aspect of the disclosure, the invention further relates to a method to adjust a brake pressure on brakes of a vehicle, the brakes being integrated in an electronic brake system, the method comprising:

receiving, by a processing circuit, wheel temperatures measured by temperature sensors located on at least two wheels of the vehicle;

calculating an average wheel temperature from the received wheel temperature of each wheel and for each wheel temperature received, calculating a wheel temperature difference between the wheel temperature and the average wheel temperature; and if the electronic brake system is activated and a wheel temperature difference of one given wheel of the at least two wheels is strictly above a temperature difference threshold, reducing a brake pressure applied to the given wheel and increasing a brake pressure applied to the other wheel or wheels to maintain a demanded brake pressure constant on the at least two wheels, by the processing circuit.

The third aspect of the disclosure may seek to provide a method to limit the damage caused to the brakes by high temperatures of the wheels of a vehicle when the vehicle is braking, with no impact on the braking performance of the vehicle. A technical benefit may include adapting the brake pressure based on the wheel temperature, to allow the wheel with an excessive temperature to cool. This preserves the lining of the brakes, thus increases the durability of the brakes, and may also improve braking performance. This is done with no impact on braking performance, as the demanded brake pressure is maintained constant, which ensures optimal safety for the driver and people in the vicinity of the vehicle.

Optionally in some examples, including in at least one preferred example, the method further comprises, after a brake pressure applied to the given wheel has been reduced, if the wheel temperature difference of the given wheel of the at least two wheels is equal to or below the temperature difference threshold, stop changing the brake pressure applied to the wheels based on the wheel temperature difference. A technical benefit may include dynamically monitoring the evolution of the temperature of the given wheel, to reduce the brake pressure for the least amount of time possible.

Optionally in some examples, including in at least one preferred example, the method further comprises, if an emergency system of the vehicle is activated, stop changing the brake pressure applied to the wheels based on the wheel temperature differences, independently of the value of the wheel temperature differences calculated by the processing circuitry. A technical benefit may include improving the safety of the driver and people in the vicinity of the truck by prioritizing emergency systems, to ensure that they function as intended when they are activated.

According to a fourth aspect of the disclosure, the invention further relates to a computer program product comprising program code for performing, when executed by the processing circuitry, the method previously described.

The fourth aspect of the disclosure may seek to provide a method to limit the damage caused to the brakes by high temperatures of the wheels of a vehicle when the vehicle is braking, with no impact on the braking performance of the vehicle. A technical benefit may include implementing the method in a computer program product that can be used in any vehicle.

According to a fifth aspect of the disclosure, the invention further relates to a non-transitory computer-readable storage medium comprising instructions, which when executed by the processing circuitry, cause the processing circuitry to perform the method previously described.

The fifth aspect of the disclosure may seek to provide a method to limit the damage caused to the brakes by high temperatures of the wheels of a vehicle when the vehicle is braking, with no impact on the braking performance of the vehicle. A technical benefit may include implementing the method in a storage medium that can be read by any processing circuitry, and can therefore be used in different vehicles.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

In the following description, when saying that two values are substantially equal to each other, it is meant that they are equal plus or minus 5%.

Figure 1:
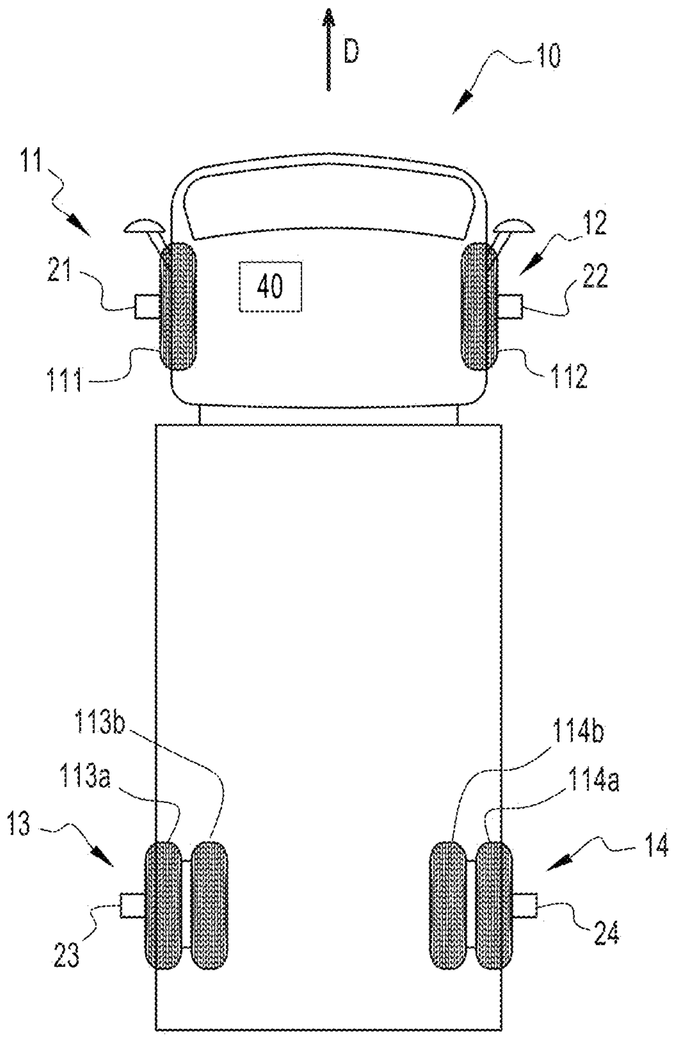
FIG. 1 is a top view of an exemplary vehicle according to an example.

FIG. 1 represents an exemplary vehicle 10. In the example of FIG. 1, the vehicle 10 is a truck. The truck 10 comprises four wheels 11, 12, 13, 14, a first wheel 11 corresponding to the front left wheel, a second wheel 12 corresponding to the front right wheel, a third wheel 13 corresponding to the rear left wheel and a fourth wheel 14 corresponding to the rear right wheel. The left and right directions are oriented according to a driving direction D of the truck 10.

In the example, the rear wheels 13 and 14 are dual wheels. In some examples, not represented, all wheels are single wheels.

In some examples, not represented, the truck 10 comprises more than four wheels, for example six or eight wheels.

The wheels 11, 12, 13, 14 comprise tires 111, 112, 113*a*, 113*b*, 114*a* and 114*b*. As the wheels 13 and 14 are dual wheels, they each comprise two tires, respectively tires 113*a* and 113*b* for wheel 113 and tires 114*a* and 114*b* for wheel 114.

The truck 10 further comprises at least two temperature sensors. In the example of FIG. 1, the truck 10 comprises four temperature sensors 21, 22, 23, 24, located on each wheel 11, 12, 13, 14. Each temperature sensor 21, 22, 23, 24 is configured to measure a wheel temperature T1, T2, T3, T4 of the wheel 11, 12, 13, 14 on which it is located.

Figure 2:
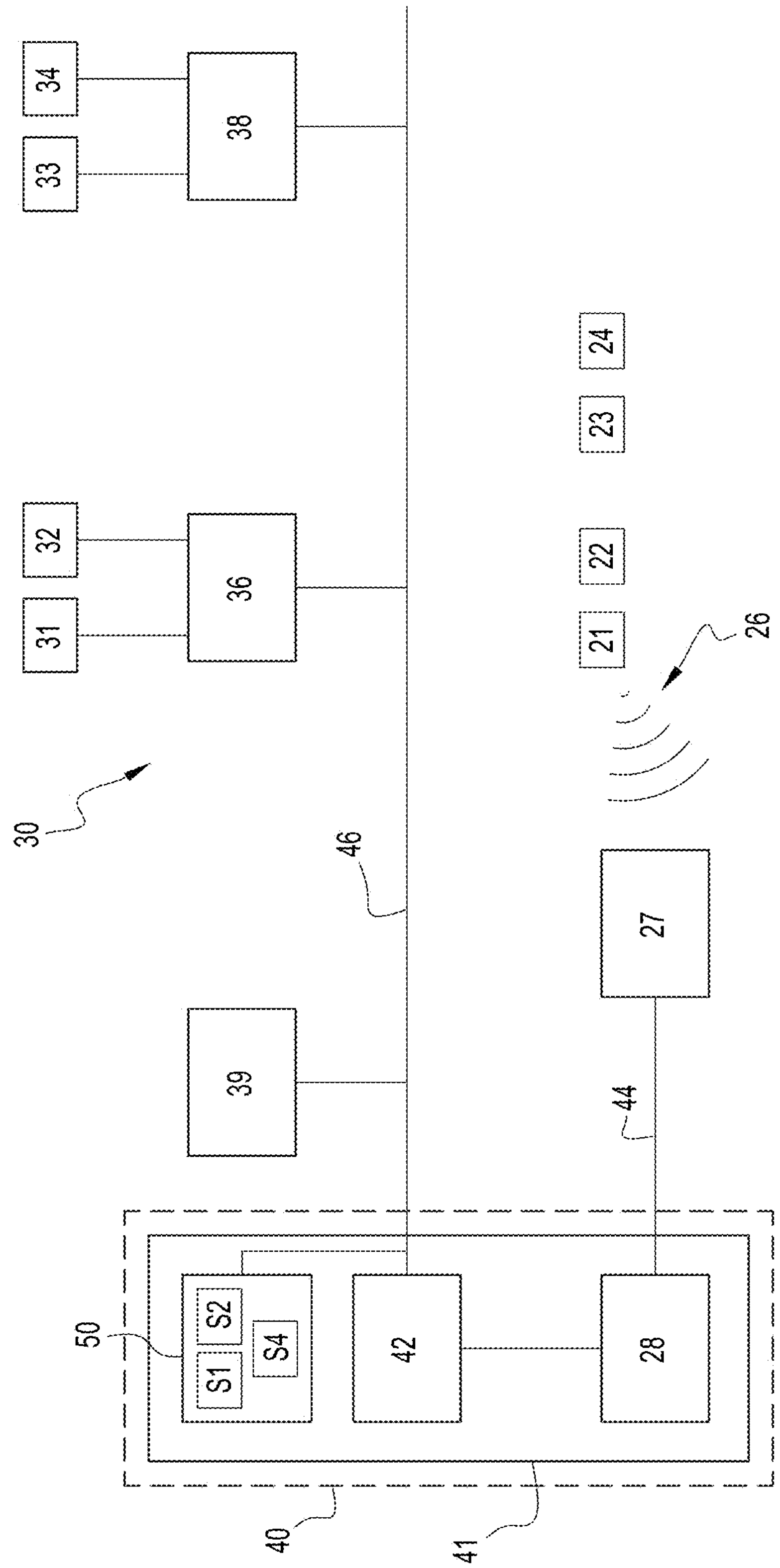
FIG. 2 is a schematic diagram of an exemplary computer system included in the vehicle of FIG. 1.

In the example of FIGS. 1 and 2, the truck 10 further comprises a tire pressure management system or TPMS 26, represented on FIG. 2, and the temperature sensors 21, 22, 23 and 24 are included in the TPMS 26. In this case, the wheel temperatures T1 to T4 measured by the temperature sensors 21 to 24 are each a temperature of the tire of each wheel 11 to 14, for example of tires 111, 112, 113*a* and 114*a*.

The TPMS 26 further comprises tire pressure sensors, which are not represented. Each tire pressure sensor is located in one of the tires of the truck 10. The TPMS 26 comprises for example six tire pressure sensors, located in each tire 111, 112, 113*a*, 113*b*, 114*a* and 114*b*. In some examples, the tire pressure sensors are also the temperature sensors 21 to 24.

In some examples, the truck 10 comprises one temperature sensor per tire. The truck 10 therefore comprises more than one temperature sensor per wheel, in particular for the rear wheels 13 and 14. In case the truck comprises more than one temperature sensor per wheel, the wheel temperature is the temperature measured by only one temperature sensor on the wheel. In variant, the wheel temperature for a given wheel is an average temperature calculated from the temperatures measured by each temperature sensor located on the given wheel.

The TPMS 26 further comprises an external receiver 27, and an electronic control unit 28, connected to the external receiver 27. The external receiver 27 is, for example, an antenna, and is configured to receive data from the temperature sensors 21 to 24, in particular, temperatures measured by the temperature sensors 21 to 24. In the example of FIGS. 1 and 2, the external receiver 27 is connected to the temperature sensors 21 to 24 wirelessly. In some non-represented examples, the external receiver 27 is connected to the temperature sensors 21 to 24 via wires.

The truck 10 further comprises an electronic brake system 30, which comprises at least two brakes, here four brakes 31, 32, 33, 34, represented on FIG. 2. The brakes 31, 32, 33, 34 are respectively located on the wheels 11, 12, 13 and 14 of the truck 10 and are called respectively front left brake 31, front right brake 32, rear left brake 33 and rear right brake 34. The brakes 31 to 34 are, for example, friction brakes and comprise each a pad configured to be pressed against the wheel to slow the wheel down.

In some examples that are not represented, the brakes are located only on some wheels, for example the brakes are only located on the front wheels 11 and 12, or on the back wheels 13 and 14. In this case, the truck 10 comprises at least two temperature sensors that are located on the wheels on which the brakes are also located.

In the example of FIGS. 1 and 2, the electronic brake system 30 further comprises two electro-pneumatic modules, or EPM 36 and 38. The EPM 36 and 38 each control two brakes, the front brakes 31 and 32 for the EPM 36, and the rear brakes 33 and 34 for the EPM 38.

The electronic brake system 30 further comprises a brake pedal 39, which is operated by the driver to activate the electronic brake system 30.

The electronic brake system 30 further comprises an electronic control unit 42, which is also part of a computer system 40 of the truck 10. The electronic control unit 42 is connected to the EPM 36 and 38 and to the brake pedal 39. In particular, the EPMs 36 and 38 act as an interface between the electronic control unit 42 and the brakes 31 to 34. The EPMs 36 and 38 are electrically connected to the electronic control unit 42 and pneumatically connected to the brakes 31 to 34 to operate them.

The computer system 40 is schematically represented on FIG. 2. The computer system 40 is adapted to execute instructions from a computer-readable medium to perform these and/or any of the functions or processing described herein. The computer system 40 may be connected, for example networked, to other components of the truck 10 in a LAN, or Local Area Network, a LIN, or Local Interconnect Network, automotive network communication protocol, an intranet, an extranet, or the Internet. The computer system 40 includes processing circuitry 41 that, in the example of FIGS. 1 and 2, comprises the electronic control unit 28 of the TPMS 26, and the electronic control unit 42 of the electronic parking brake 30. The electronic control units 28 and 42 communicate with each other advantageously via a Controller Area Network bus, or CAN bus 44.

More generally, the computer system 40 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Arca Network (CAN) bus, etc.

In some non-represented examples, the computer system 40 may comprise at least one computing device or electronic device capable of including firmware, hardware, and/or executing software instructions to implement the functionality described herein. The computer system 40 may further include a memory, and a system bus, not represented, in addition to the processing circuitry 41. The system bus provides an interface for system components including, but not limited to, the memory and the processing circuitry 41. The processing circuitry 41 may include any number of hardware components for conducting data or signal processing or for executing computer code stored in memory.

The processing circuitry 41 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. In particular, the electronic control units 28 and 42 may each comprise these elements. The processing circuitry 42 may further include computer executable code that controls operation of the programmable device.

The system bus may be any of several types of bus structures that may further interconnect to a memory bus (with or without a memory controller), a peripheral bus, and/or a local bus using any of a variety of bus architectures. The memory may be one or more devices for storing data and/or computer code for completing or facilitating methods described herein. The memory may include database components, object code components, script components, or other types of information structure for supporting the various activities herein. Any distributed or local memory device may be utilized with the systems and methods of this description. The memory may be communicably connected to the processing circuitry 41 via a circuit or any other wired, wireless, or network connection and may include computer code for executing one or more processes described herein. The memory may include non-volatile memory, electrically erasable programmable read-only memory, and volatile memory, or any other medium which can be used to carry or store desired program code in the form of machine-executable instructions or data structures and which can be accessed by a computer or other machine with processing circuitry 41.

In some examples, which are not represented, the computer system 40 may further include or be coupled to a non-transitory computer-readable storage medium such as the storage device, which may comprise, for example, an internal or external hard disk drive (HDD) such as enhanced integrated drive electronics (EIDE) or serial advanced technology attachment (SATA), HDD for storage, flash memory, or the like. The storage device and other drives associated with computer-readable media and computer-usable media may provide non-volatile storage of data, data structures, computer-executable instructions, and the like.

Computer-code, which is hard or soft coded, may be provided in the form of one or more modules. The module(s) can be implemented as software and/or hard-coded in circuitry to implement the functionality described herein in whole or in part. The modules may be stored in the storage device and/or in the memory.

All or a portion of the examples disclosed herein may be implemented as a computer program stored on a transitory or non-transitory computer-usable or computer-readable storage medium (e.g., single medium or multiple media), such as the storage device, which includes complex programming instructions such as complex computer-readable program code, to cause the processing circuitry 41 to carry out actions described herein. Thus, the computer-readable program code of the computer program can comprise software instructions for implementing the functionality of the examples described herein when executed by the processing circuitry 41. In some examples, the storage device may be a computer program product, for example, a readable storage medium storing the computer program thereon, where at least a portion of a computer program may be loadable, for example, into a processor for implementing the functionality of the examples described herein when executed by the processing circuitry 41. The processing circuitry 41 may serve as a controller or control system for the computer system 40 that is to implement the functionality described herein.

The computer system 40 may include an input device interface configured to receive input to be communicated to the computer system 40 when executing instructions. In particular, the external receiver 27 is connected to the computer system 40 via the CAN bus 44, and the brake pedal 39 and the EPMs 36 and 38 are connected to the processing circuitry 41 via a brake CAN bus 46. More precisely, the external receiver 27 is connected to the electronic control unit 28 of the TPMS 26. The brake pedal 39 and the EPMs 36 and 38 are connected to the electronic control unit 42 of the electronic brake system 30 via the brake CAN bus 46.

The computer system 40 may include an output device interface configured to forward an output, such as to a display, for example, a video display unit. The computer system 40 may include a communications interface suitable for communicating with a network as appropriate or desired.

The truck 10 advantageously comprises an emergency system 50 implemented in the computer system 40, comprising for example an emergency braking system 51, to command the brakes 31 to 34 for example to avoid a collision, an anti-blocking system or ABS 52 and/or an electronic stability control, or ESC 54.

Figure 3:
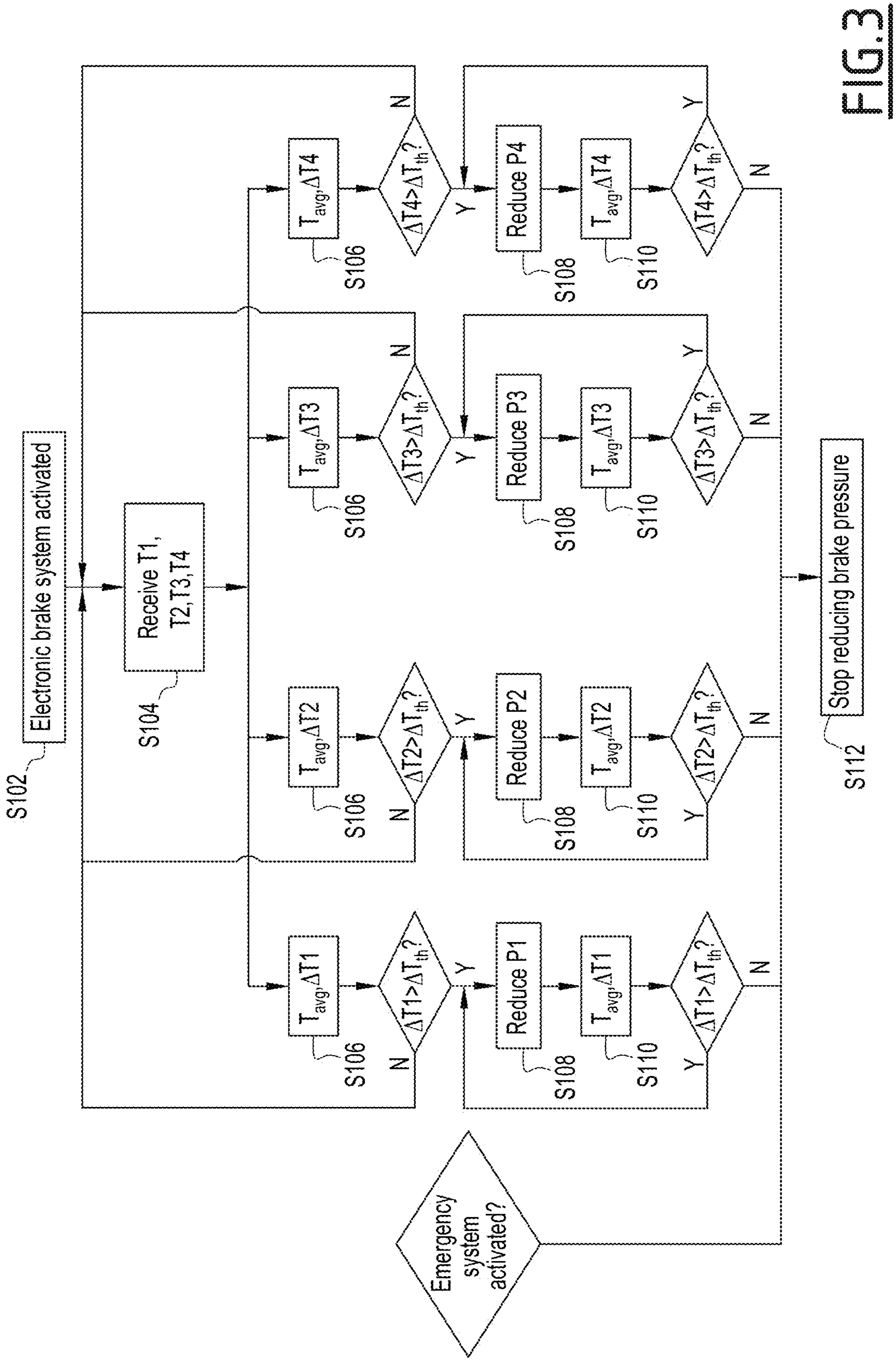
FIG. 3 is a flow chart of a method to adjust a brake pressure according to an example.
Figure 4:
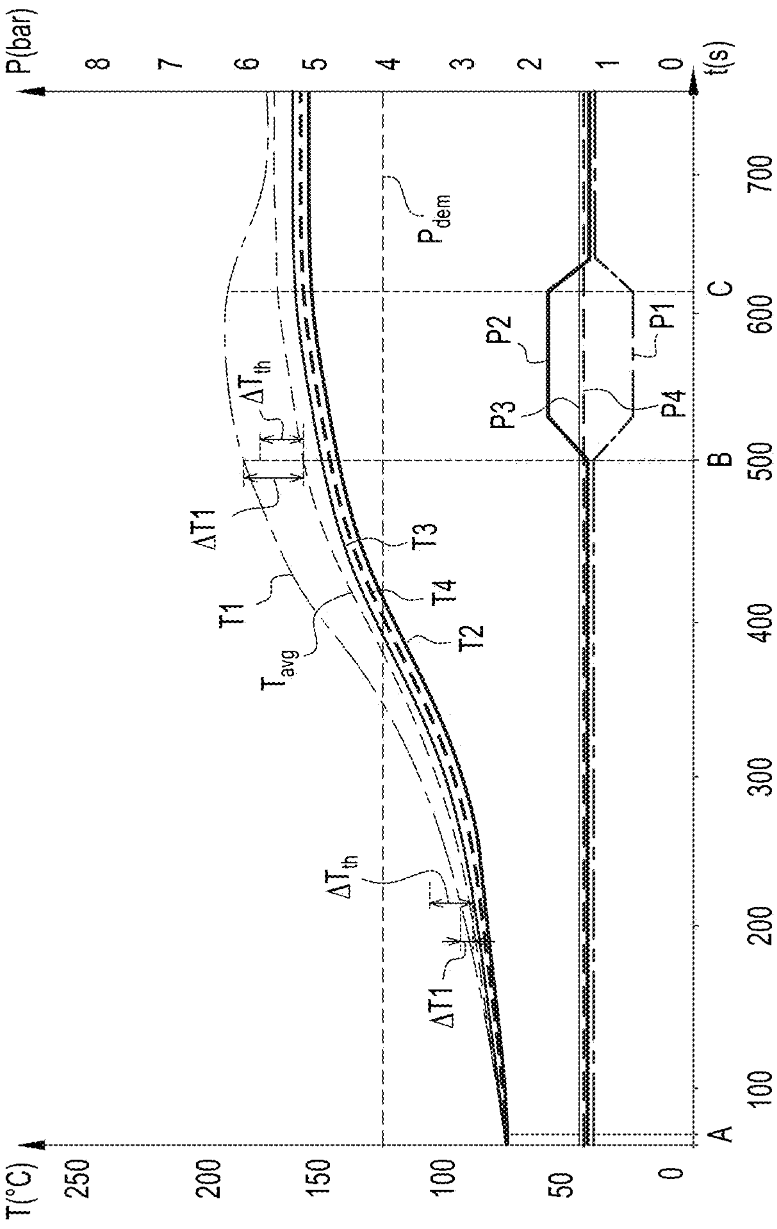
FIG. 4 is a graph of wheel temperatures and brake pressures applied to wheels of the vehicle of FIG. 1.

A method to adjust the brake pressures P1 to P4 applied on the wheels 11 to 14 by the brakes 31 to 34 of the truck 10 is now described, with reference to FIGS. 3 and 4.

The truck 10 is initially being driven by the driver, for example on open road. The brakes 31 to 34 are not applied, neither by the driver or automatically.

The driver activates the electronic brake system 30 at braking step S102. In particular, to do so, the driver operates the brake pedal 39. For example, he presses on the brake pedal 39 with his foot, which activates the electronic braking system 30. This corresponds to time point A in FIG. 4. Based on the command of the driver, in other words, on the amount of pressure he exerts on the brake pedal 39, a demanded brake pressure $P_{dem}$ is determined by the electronic control unit 42, based on a pressure exerted by the driver on the brake pedal 39. The demanded brake pressure $P_{dem}$ is used to determine the value of the brake pressures P1 to P4 applied to the wheels 11 to 14 by the electronic control unit 42. In some examples, the demanded pressure $P_{dem}$ is the pressure delivered to the brakes 31 to 34 and is associated with the brake pressures P1 to P4. In some examples, the demanded pressure $P_{dem}$ is associated with the sum of the brake pressures P1 to P4. In the examples of the figures, the demanded brake pressure $P_{dem}$ is equal to the sum of the brake pressures P1 to P4. Advantageously, the brake pressures P1, P2, P3 and P4 are substantially equal to each other, and are applied respectively to wheels 11, 12, 13 and 14. The wheel temperatures T1, T2, T3 and T4 increase, as visible on FIG. 4, due to the friction caused by the brakes 31 to 34 rubbing against the wheels 11 to 14, respectively.

The temperature sensors 21 to 24 measure the wheel temperature T1, T2, T3 and T4 of each wheel 11 to 14 on which they are located, and the processing circuitry 41 receives the wheel temperatures T1 to T4 from the temperature sensors 21 to 24 at receiving step S104. The wheel temperatures T1 to T4 are represented on FIG. 4. As previously described, in the example of the FIGS. 1 and 2, the wheel temperatures T1 to T4 correspond respectively to the temperature of the tires 111, 112, 113*a* and 114*a*. Advantageously, during the receiving step S104, the electronic control unit 28 of the TPMS 26 receives the wheel temperatures T1 to T4 via the external receiver 27 and sends them to the electronic control unit 42 of the electronic brake system 30 via the CAN bus 44.

The processing circuitry 41, and in particular the electronic control unit 42, calculates a wheel temperature average $T_{avg}$ and a wheel temperature difference ΔT1, ΔT2, ΔT3, and ΔT4 for each wheel 11 to 14 during determination step S106. For each wheel 11 to 14, the wheel temperature difference ΔT1 to ΔT4 corresponds to the difference between the wheel temperature average $T_{avg}$ and the wheel temperature T1 to T4. For i an integer between 1 and 4, the wheel temperature difference ΔTi is obtained by the following equation:

$$\Delta Ti = T_{avg} - Ti$$

In the example of FIG. 4, the receiving step S104 and the determination step S106 are advantageously performed continuously.

If the electronic brake system 30 is activated, the processing circuitry 41, advantageously the electronic control unit 42, determines if one of the wheel temperature differences ΔT1 to ΔT4 is strictly above a temperature difference threshold $\Delta T_{th}$. If the wheel temperature difference of a given wheel, for example the wheel temperature difference ΔT1 of wheel 11, as represented in FIG. 4, is strictly above the temperature difference threshold $\Delta T_{th}$, the processing circuitry 41 reduces a brake pressure P1 applied to the given wheel 11 and increases at least one brake pressure P2, P3, P4 applied to the other wheels 12, 13 and 14 during a reducing step S108. In the example of FIGS. 1 and 2, to perform reducing step S108, the electronic control unit 42 sends a command signal to the EPM 36 and 38 via the CAN bus 46, to adapt the brake pressures P1 to P4.

Reducing step S108 is implemented at time point B of FIG. 4. The reducing step S108 allows the friction on the wheel 11 to be reduced, and therefore allows wheel 11 to cool down. A demanded brake pressure $P_{dem}$ is maintained constant on the wheels 11 to 14, so that a braking efficiency remains the same. In particular, a deceleration speed of the truck 10 remains constant before and after reducing step S108.

In some examples, the brake pressure of the wheel that has a wheel temperature difference strictly above the temperature difference threshold $\Delta T_{th}$, in this case, the brake pressure P1 is increased by a predetermined amount, for example 0.5 bar.

In some examples, and as represented in FIG. 4, during reducing step S108, the brake pressure is increased only for one wheel. For example, the brake pressure P1 applied to the wheel 11 is reduced by 0.5 bar and only the brake pressure P2 applied to wheel 12 is increased by 0.5 bar. In particular, if the brake pressure decreases for one front wheel, for example wheel 11, then the brake pressure P2 of the other front wheel 12 is increased to keep the demanded pressure $P_{dem}$ constant, and the brake pressures P3 and P4 applied to the rear wheels 13 and 14 are not changed.

If none of the wheel temperature differences ΔT1, ΔT2, ΔT3, and ΔT4 are strictly above the temperature difference threshold $\Delta T_{th}$, then receiving step S104 and determination step S106 are performed again, and an iterative process is implemented.

In the example of FIG. 4, advantageously, after reducing step S108 is performed, the processing circuitry 41, more precisely the electronic control unit 42, determines again the wheel temperature average $T_{avg}$ and the wheel temperature difference of the given wheel that was above the temperature difference threshold $\Delta T_{th}$, here ΔT1, during determination step S110.

The brake pressures P1 to P4 may be modified while steps S104 to S110 are performed, if the demanded brake pressure $P_{dem}$ changes, for example, if the driver applies more, or less, pressure on the brake pedal 39. In some examples, if one of the brakes 31 to 34 applies a reduced brake pressure P1 to P4 as a result of step S108, for example P1, then the brake pressure P1 will remain smaller than the other brake pressures P2 to P4 even when the demanded brake pressure $P_{dem}$ changes.

If after performing step S110, the wheel temperature difference ΔT1 is strictly above the wheel temperature difference threshold $\Delta T_{th}$, then the processing circuitry 41 performs again reducing step S108, and an iterative process is implemented. In some examples, when performing again reducing step S108, the brake pressure P1 is maintained at its current pressure level, for example 0.5 bar, as visible in FIG. 4. In some examples, not represented, when performing again step S108, the pressure P1 is decreased again, for example by the predetermined amount of 0.5 bar, until the brake pressure P1 applied to the wheel 11 is equal to zero.

If the wheel temperature difference ΔT1 is equal to or below the temperature difference threshold $\Delta T_{th}$, then a step S112 of stop changing the brake pressure P1 to P4 applied to the wheels 11 to 14, based on the wheel temperature difference ΔT1, is performed by the processing circuitry 41, more precisely by the electronic control unit 42. In particular, during step S112, the brake pressure P1 applied to the given wheel 11 stops being reduced and the brake pressure P2, P3 and/or P4 stop being increased. Therefore, the brake pressures P1 to P4 are again substantially equally applied to each wheel 11 to 14. This is represented at time point Con FIG. 4.

Advantageously, after step S112, the processing circuitry 41 performs again steps S104 to S110 and an iterative process is implemented, for as long as the electronic parking brake 30 is activated by the driver.

In some examples, including the example of FIG. 3, if, at any point while the driver is driving the truck 10, the processing circuitry 41 determines that the emergency system 50 is activated, then the processing circuitry 41 stops performing changes to brake pressure P1 to P4 based on wheel temperature differences ΔT1 to ΔT4, which corresponds to step S112, independently of the wheel temperature differences ΔT1 to ΔT4 calculated by the processing circuitry 41. In other words, step S112 is performed if the processing circuitry 41 determines that one of the emergency brake system 51, the ABS 52, or the ECS 54 are activated, whatever the values of the temperature differences ΔT1 to ΔT4 may be.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A computer system 40 for a vehicle 10, the vehicle 10 comprising an electronic brake system 30, the computer system 40 comprising processing circuitry 41 configured to:

receive a wheel temperature T1, T2, T3, T4 of at least two wheels 11, 12, 13, 14 of the vehicle 10, from temperature sensors 21, 22, 23, 24 located on the at least two wheels 11, 12, 13, 14;

calculate an average wheel temperature $T_{avg}$ from the received wheel temperatures T1, T2, T3, T4;

for each wheel temperature T1, T2, T3, T4 received, determine a wheel temperature difference ΔT1, ΔT2, ΔT3, ΔT4 between the wheel temperature T1, T2, T3, T4 and the average wheel temperature $T_{avg}$;

the processing circuitry 41 being further configured to, if the electronic brake system (30) is activated and a wheel temperature difference ΔT1, ΔT2, ΔT3, ΔT4 of one given wheel of the at least two wheels 11, 12, 13, 14 is strictly above a temperature difference threshold $\Delta T_{th}$, reduce a brake pressure P1, P2, P3, P4 applied to the given wheel 11, 12, 13, 14 by the electronic brake system 30 and increase a brake pressure P1, P2, P3, P4 applied to the other wheel or wheels 11, 12, 13, 14 by the electronic brake system 30 to maintain a demanded brake pressure $P_{dem}$ constant on the wheels 11, 12, 13, 14.

Example 2: The computer system 40 of example 1, wherein the processing circuitry 41 is further configured to, after a brake pressure P1, P2, P3, P4 applied to the given wheel 11, 12, 13, 14 has been reduced, if the wheel temperature difference ΔT1, ΔT2, ΔT3, ΔT4 of the given wheel 11, 12, 13, 14 of the at least two wheels 11, 12, 13, 14 is equal to or below the temperature difference threshold $\Delta T_{th}$, stop changing the brake pressures P1, P2, P3, P4 applied to the wheels 11, 12, 13, 14 based on the wheel temperature difference ΔT1, ΔT2, ΔT3, ΔT4.

Example 3: The computer system 40 of any of examples 1 to 2, wherein the processing circuitry 41 is further configured to:

determine if an emergency system 50 of the vehicle 10 is activated; and stop performing changes to the brake pressures P1, P2, P3, P4 based on wheel temperature differences ΔT1, ΔT2, ΔT3, ΔT4, independently of the value of the wheel temperature differences ΔT1, ΔT2, ΔT3, ΔT4, if the emergency system 50 of the vehicle 10 is activated.

Example 4: A vehicle 10 comprising wheels 11, 12, 13, 14, an electronic brake system 30, at least two temperature sensors 21, 22, 23, 24 located on at least two of the wheels 11, 12, 13, 14 of the vehicle 10 and the computer system 40 of any of examples 1 to 3.

Example 5: The vehicle of example 4, wherein a temperature sensor 21, 22, 23, 24 is located on each wheel 11, 12, 13, 14 of the vehicle 10.

Example 6: The vehicle of any of examples 4 and 5, wherein the temperature sensors 21, 22, 23, 24 are integrated into a tire pressure monitoring system 26 of the vehicle 10.

Example 7: The vehicle of any of examples 4 to 6, wherein each temperature sensor 21, 22, 23, 24 is configured to measure a temperature of a tire 111, 112, 113*a*, 113*b* of the wheel 11, 12, 13, 14 on which each temperature sensor 21, 22, 23, 24 is located, and the wheel temperature T1, T2, T3, T4 of each wheel is a temperature of the tire of each wheel 11, 12, 13, 14.

Example 8: A method to adjust a brake pressure P1, P2, P3, P4 on brakes 31, 32, 33, 34 of a vehicle 10, the brakes 31, 32, 33, 34 being integrated in an electronic brake system (30, the method comprising:

receiving S104, by a processing circuit 41, wheel temperatures T1, T2, T3, T4 measured by temperature sensors 21, 22, 23, 24 located on at least two wheels 11, 12, 13, 14 of the vehicle 10;

calculating S106 an average wheel temperature $T_{avg}$ from the received wheel temperature T1, T2, T3, T4 of each wheel 11, 12, 13, 14 and for each wheel temperature T1, T2, T3, T4 received, calculating a wheel temperature difference ΔT1, ΔT2, ΔT3, ΔT4 between the wheel temperature T1, T2, T3, T4 and the average wheel temperature $T_{avg}$; and if the electronic brake system 30 is activated and a wheel temperature difference ΔT1, ΔT2, ΔT3, ΔT4 of one given wheel 11, 12, 13, 14 of the at least two wheels 11, 12, 13, 14 is strictly above a temperature difference threshold $\Delta T_{th}$, reducing S108 a brake pressure P1, P2, P3, P4 applied to the given wheel 11, 12, 13, 14 and increase a brake pressure P1, P2, P3, P4 applied to the other wheel or wheels 11, 12, 13, 14 to maintain a demanded brake pressure $P_{dem}$ constant on the at least two wheels 11, 12, 13, 14, by the processing circuit 41.

Example 9: The method of example 8, further comprising, after a brake pressure P1, P2, P3, P4 applied to the given wheel 11, 12, 13, 14 has been reduced S108, if the wheel temperature difference ΔT1, ΔT2, ΔT3, ΔT4 of the given wheel 11, 12, 13, 14 of the at least two wheels 11, 12, 13, 14 is equal to or below the temperature difference threshold $\Delta T_{th}$, stop changing S112 the brake pressure P1, P2, P3, P4 applied to the wheels 11, 12, 13, 14 based on the wheel temperature difference ΔT1, ΔT2, ΔT3, ΔT4.

Example 10: The method of any of examples 8 or 9, further comprising, if an emergency system 50 of the vehicle 10 is activated, stop changing S112 the brake pressure P1, P2, P3, P4 applied to the wheels 11, 12, 13, 14 based on the wheel temperature differences ΔT1, ΔT2, ΔT3, ΔT4, independently of the value of the wheel temperature differences ΔT1, ΔT2, ΔT3, ΔT4 calculated by the processing circuitry 41.

Example 11: A computer program product comprising program code for performing, when executed by the processing circuitry 41, the method of any of examples 8 to 10.

Example 12: A non-transitory computer-readable storage medium comprising instructions, which when executed by the processing circuitry 41, cause the processing circuitry 41 to perform the method of any of examples 8 to 10.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system for a vehicle, the vehicle comprising an electronic brake system, the computer system comprising processing circuitry configured to:

receive a wheel temperature of at least two wheels of the vehicle, from temperature sensors located on the at least two wheels;

calculate an average wheel temperature from the received wheel temperatures;

for each wheel temperature received, determine a wheel temperature difference between the wheel temperature and the average wheel temperature;

the processing circuitry being further configured to, if the electronic brake system is activated and a wheel temperature difference of one given wheel of the at least two wheels is strictly above a temperature difference threshold, reduce a brake pressure applied to the given wheel by the electronic brake system and increase a brake pressure applied to the other wheel or wheels by the electronic brake system to maintain a demanded brake pressure constant on the wheels.

2. The computer system of claim 1, wherein the processing circuitry is further configured to, after a brake pressure applied to the given wheel has been reduced, if the wheel temperature difference of the given wheel of the at least two wheels is equal to or below the temperature difference threshold, stop changing the brake pressures applied to the wheels based on the wheel temperature difference.

3. The computer system of claim 1, wherein the processing circuitry is further configured to:

determine if an emergency system of the vehicle is activated; and stop performing changes to the brake pressures based on wheel temperature differences, independently of the value of the wheel temperature differences, if the emergency system of the vehicle is activated.

4. A vehicle comprising wheels, an electronic brake system, at least two temperature sensors located on at least two of the wheels of the vehicle and the computer system of claim 1.

5. The vehicle of claim 4, wherein a temperature sensor is located on each wheel of the vehicle.

6. The vehicle of claim 4, wherein the temperature sensors are integrated into a tire pressure monitoring system of the vehicle.

7. The vehicle of claim 4, wherein each temperature sensor is configured to measure a temperature of a tire of the wheel on which each temperature sensor is located, and the wheel temperature of each wheel is a temperature of the tire of each wheel.

8. A method to adjust a brake pressure on brakes of a vehicle, the brakes being integrated in an electronic brake system, the method comprising:

receiving, by a processing circuit, wheel temperatures measured by temperature sensors located on at least two wheels of the vehicle;

calculating an average wheel temperature from the received wheel temperature of each wheel and for each wheel temperature received, calculating a wheel temperature difference between the wheel temperature and the average wheel temperature; and if the electronic brake system is activated and a wheel temperature difference of one given wheel of the at least two wheels is strictly above a temperature difference threshold, reducing a brake pressure applied to the given wheel and increase a brake pressure applied to the other wheel or wheels to maintain a demanded brake pressure constant on the at least two wheels, by the processing circuit.

9. The method of claim 8, further comprising, after a brake pressure applied to the given wheel has been reduced, if the wheel temperature difference of the given wheel of the at least two wheels is equal to or below the temperature difference threshold, stop changing the brake pressure applied to the wheels based on the wheel temperature difference.

10. The method of claim 8, further comprising, if an emergency system of the vehicle is activated, stop changing the brake pressure applied to the wheels based on the wheel temperature differences, independently of the value of the wheel temperature differences calculated by the processing circuitry.

11. A computer program product comprising program code for performing, when executed by the processing circuitry, the method of claim 8.

12. A non-transitory computer-readable storage medium comprising instructions, which when executed by the processing circuitry, cause the processing circuitry to perform the method of claim 8.

* * * * *